United States Patent [19]

Philipps

[11] 4,075,155

[45] Feb. 21, 1978

[54] MOLDING COMPOUNDS

[75] Inventor: Thomas E. Philipps, Granville, Ohio

[73] Assignee: Owens-Corning Fiberglas Corporation, Toledo, Ohio

[21] Appl. No.: 751,569

[22] Filed: Dec. 17, 1976

Related U.S. Application Data

[63] Continuation-in-part of Ser. No. 647,487, Jan. 8, 1976, abandoned, which is a continuation-in-part of Ser. No. 524,732, Nov. 18, 1974, abandoned.

[51] Int. Cl.$^2$ ................................................ C08K 3/40
[52] U.S. Cl. ........................................ 260/38; 106/90
[58] Field of Search .................... 260/38, 29.3; 106/90

[56] References Cited

U.S. PATENT DOCUMENTS

| 3,502,610 | 3/1970 | Thompson | 260/38 |
| 3,956,227 | 5/1976 | Foley et al. | 260/38 |

Primary Examiner—Sandra M. Person
Attorney, Agent, or Firm—Ronald C. Hudgens; Patrick P. Pacella; William P. Hickey

[57] ABSTRACT

I have developed sheet molding compounds comprising aldehyde condensate thermosetting resins and inorganic fillers.

17 Claims, No Drawings

MOLDING COMPOUNDS

This application is a continuation-in-part of application Ser. No. 647,487, filed Jan. 8, 1976; which is a continuation-in-part of application, Ser. No. 524,732, filed Nov. 18, 1974, both now abandoned.

The present invention relates to a new and improved method of making molding compounds, and particularly sheet molding compounds.

BACKGROUND OF THE INVENTION

Sheet molding compounds are made commercially by utilizing polyester resin forming material of a type which utilize one type of chemical reaction to convert the resin prepolymer from a sticky paste into a semi solid, and which utilize another type of chemical reaction to convert the polyester resin into an insoluble infusible state. In the case of polyesters, the second reaction is accomplished by the crosslinking of unsaturate bonds using an unsaturated liquid monomer; and the first chemical reaction is accomplished by reacting the carboxyl end stopped prepolymer molecules with an alkaline material such as calcium or magnesium oxide. The liquid monomer that is necessary for the second stage of reaction must be present during the first stage reaction, and this liquid monomer works against the conversion of the materials to a solid handleable state during the first stage reaction. Therefore, the prior art sheet molding compound must be made between impervious sheets while in the unhandleable state and must be cured for several days in maturation rooms in order to achieve the handleable state and must be prevented from becoming dried out so that it does not lose its reactive liquid monomers.

A principal object of the present invention is the provision of a new and improved method of making sheet molding compound which does not require organic liquids to be present, and which does not need to be prevented from drying out.

Another object of the present invention is the provision of a new and improved process for making sheet molding compounds wherein the first and second stages of curing involves formation of methylol groups and/or the removal of water.

A further object is the production of sheet molding compounds from aldehyde condensates.

DESCRIPTION OF THE PREFERRED EMBODIMENTS

According to the present invention, a sheet molding compound is made utilizing an aldehyde condensate resin, and more particularly a phenol-aldehyde condensate resole. Aldehyde resoles have been used heretofore as binders for cementing materials together, as for example, layers of wood to form plywood and criss-crossing fibers together to form bonded mats. Resoles have not been successful as binders for inorganic filled molding compounds and particularly sheet molding compounds. Some of the problems involved with the use of resoles is that they contain a considerable amount of water, and are very tacky adhesives. In order to overcome the sticky gluey nature, the prior art binders utilize the resoles as dilute less tacky solutions. Such thin solutions have not been used in molding compounds, however, because the water present in the resole syrup flashes off during molding to produce porosity and blisters in the molded parts. The phenol-formaldehyde condensates, which have been used in molding compounds, have been in the dry powdered novolak state and have been used with low density fillers such as saw dust, which absorb some of the water liberated during the crosslinking of the novolak.

According to the present invention, a liquid aldehyde condensate resole is blended with a high percentage by weight of inorganic fillers that have previously been blended with or contain a base type catalyst, such as calcium hydroxide, magnesium hydroxide, or barium hydroxide, and if desired a mold release agent. If desired, a coupling agent can be added either to the liquid resole or the mixture of resin and filler materials. The fillers and other solid ingredients are preferably powders, a high percentage of which are less than 100 and preferably below 200 mesh so that the solids have an extremely large surface area and will pack. Fifty percent by weight or more of such compacted powderous solids when mixed with a resole produces a plastic mix having a generally uniform distribution of the resin throughout the mix. This can be flowed out upon a surface and preferably a plastic surface, as for example, a polyethylene sheet; a layer of chopped glass fibers can be deposited thereon; and another layer of plastic mix can be put down upon the top surface of the fibers to form a sheet molding compound. The two layers can be compressed together to work the plastic mix in and around the fibers as by a pair of rolls to remove air from between the fibers and to replace the air with plastic mix. Such materials are known as sheet molding compounds. I have established that resoles will thicken when mixed with fillers which contain a base preferably a divalent base, as for example Ca $(OH)_2$, Mg $(OH)_2$, Ba $(OH)_2$ or diamines; and so it is practical to make sheet molding compounds from aldehyde condensates. It is theorized that one mechanism of thickening occurs through the formation of phenolate salts upon standing, especially with a small amount of heat, and that still other thickening mechanisms exist.

The production of phenolic moldings is an old art having involved, over the years, the use of two different types of phenol-formaldehyde condensate: novolaks and resoles. The novolaks were produced by condensing formaldehyde and phenol in a mole ratio of about 1:1 or slightly less and usually in the presence of an acidic condensing agent. Condensation was carried essentially to completion, so that the novolak became water insoluble and could be separated from associated water and used to formulate a molding compound by mixing with a curing agent, usually hexamethylenetetramine and other additives such as fillers, reinforcements, and mold release agents. Moldings were then produced in matched molds by the "heat pressure" method disclosed in an early Baekeland patent.

Moldings have also been made by a casting technique from resoles: partial condensates of formaldehyde and phenol in a higher mole ratio, usually at least about 1.5:1; condensation is caused by heating, usually in the presence of a fixed alkali condensing agent. Condensation is interrupted at a desired end point by discontinuing heating and acidifying to a desired pH at which room temperature condensation is comparatively slow. The casting can then be produced from the partial condensate by adding a "hardener," e.g., a solution of hydrochloric or phosphoric acid in glycerine or in a glycol and pouring the resulting composition into a mold. Cure proceeds at ambient or a slightly higher temperature. A detailed discussion of phenol-formaldehyde condensates appears in The Chemistry of Phenolic Resins, Martin, John Wiley & Sons, Inc., 1956, and cited references.

The prior art (U.S. Pat. No. 3,502,610) also suggests that laminate, coatings, moldings, and expanded foams can be produced from a polyhydric phenol-aldehyde resin containing 2–6 percent hydraulic cement, based on the weight of the polyhydric phenol. The cement is said to lower the viscosity of the resin and to give it high temperature strength and fire retarding properties.

The resin can be a phenol-formaldehyde condensate or a phenol-amino compound-formaldehyde condensate.

The amino compound generally is urea, melamine, or dicyandiamide.

The mole ratio of formaldehyde to phenol can be varied within wide limits in producing the resins for this invention. Indeed, in one sense, there is no upper limit on this ratio because portland cement has been found to cure the resins to an infusible condition. As a practical matter, I prefer that the mole ratio of formaldehyde to phenol range from 1:1 to 4:1. Most desirably, this ratio ranges from 1.5:1 to 3:1.

The ratio by weight of the thermosetting resin to cement ranges from 4:1 to 1:9. Generally, this ratio ranges from 4:1 to 1:5. More specifically, the ratio ranges from 3:1 to 1:3. Please note that a mixture of thermosetting resin and cement having a weight ratio of resin to hydrated cement of 1:3 has a volume ratio of about 1:1.

The molding compounds of this invention have good flame resistance and low smoke producing properties. They can be used to form shingles, appliances such as bathtubs, and coatings.

The term "cement" includes magnesium oxychloride cements, magnesium oxysulfate cements, gypsum cements, and a wide variety of hydraulic cements. Briefly, hydraulic cements are those inorganic cements which set and harden by the addition of water. Specific examples of hydraulic cements include aluminous cements, masonry cements, natural cements, portland cements, portland blast furnace slag cement, portland pozzolan cement, and slag cement. Preferably, I use hydraulic cement alone or in conjunction with the other cements.

The following examples further illustrate my invention.

EXAMPLE 1

EXAMPLE 1

| Ingredients | Parts by Weight | Mol Ratio |
|---|---|---|
| Formaldehyde (Formalin 52%) | 127.90 | 3.1 |
| Phenol | 67.10 | 1 |
| Calcium Oxide | 3.78 | |
| Dicyandiamide | 3.35 | |
| Urea (liquid — 50% water) | 20.06 | |

The phenol and formaldehyde were charged to a reactor, blended, and heated to a temperature of 110° F. The calcium oxide catalyst then was added over a two-hour period while maintaining the temperature at 110° F. The temperature of the reactants was increased to 125° F over a 30-minute period and then maintained at that temperature for an additional 90 minutes. The temperature then was raised to 140° F during a time period of 30 minutes and maintained at that temperature until the free formaldehyde content ranges from 7.0 to 7.2 percent by weight. The dicyandiamide was added over a 30-minute period at 140° F and the reaction was cooled to 105° F over the next 1/2-hour period. The urea was added at 105° F and neutralization followed when the temperature dropped below 100° F by addition of a mixture of 20 percent by weight of sulfuric acid to a pH ranging from 7.2 to 7.3.

Physical properties of the Example 1 resin are as follows:

| | |
|---|---|
| Stroke Cure | 77 seconds |
| Free Phenol | 1.2 percent |

EXAMPLE 2

I mixed the following materials in a stainless steel vessel:

| Material | Weight, grams |
|---|---|
| Resin of Example 1 | 5000 |
| Portland cement | 2500 |
| Gypsum cement | 2500 |
| Alumina trihydrate | 2000 |
| Zinc stearate | 200 |

The resulting composition was co-deposited with chopped glass fiber strand on a moving polyethylene film approximately 24-inches in width and of indefinite length. A second polyethylene film, also 24-inches in width and of indefinite length, was brought into contact with the upper surface of the sheet-like mass of deposited glass fibers and resin-cement mixture and was moved with the mass and the first sheet. Sheets of the mass, approximately 24-inches by 20-inches by ⅛-inch were cut from the mass leaving the polyethylene films on each of the two major sides thereof. Moldings were produced from these sheets between matched flat dies: five minutes at 300° F and 2000 pounds per square inch. Naturally, I removed both polyethylene sheets before I made the moldings.

Materials produced as described above are called sheet molding compounds and were tested for flexural modulus, for flexural strength, for tensile strength, and for notched Izod impact strength: (1) as molded, and (2) after they had been autoclaved for 16 hours. Results of this testing are summarized in the following table.

In the Examples, flexural strength and flexural modulus were determined according to ASTM Specification D790, tensile strength was determined according to ASTM Specification D638, and impact strength was determined according to ASTM Specification D256.

TABLE

| | Flexural Strength psi $\times 10^3$ | Flexural Modulus psi $\times 10^6$ | Tensile Strength psi $\times 10^3$ | Notched Izod Impact Strength ft., lbs./in. |
|---|---|---|---|---|
| As molded | 11.99 | 1.107 | 4.37 | 8.92 |
| After 16 hours of autoclaving | 7.65 | 0.759 | 2.41 | 6.5 |

These results demonstrate that the thermosetting resins of this invention possess physical properties which make them very desirable for use as molding compounds. The molded articles were found to be fire resistant and low smoke producing. They were easily cured in a closed mold.

EXAMPLE 3

A sheet molding compound is made from the following materials given in percent by weight using the procedures of Examples 1 and 2:

| Material | Percent by Weight |
|---|---|
| Ca CO$_3$ powdered | 59 |
| Resole of Example 1 (50% solids) | 21 solids |
| Glass fibers (1-inch chopped strand) | 14 |
| Mg (OH)$_2$ | 6 |

Articles molded from the sheet molding compound using the procedure of Example 2 have substantially the same properties as does the products of Example 2.

EXAMPLE 4

A sheet molding compound is made from the following materials given in percent by weight using the procedures of Examples 1 and 2:

| Material | Percent by Weight | |
|---|---|---|
| Clay (Al$_2$ (Si O$_3$)$_3$ powdered) | 62.5 | |
| Mica | 5.5 | |
| Phenol-formaldehyde resole (F/P ratio 3.7, 50% solids) | 17 | (solids) |
| Glass fibers (1-inch chopped strand) | 5 | |
| Ba (OH)$_2$ | 10 | |

Articles molded from the sheet molding compound using the procedure of Example 2 have properties comparable to those of Example 2.

Any hydrating or nonhydrated inorganic filler can be used since the fillers can be, for all intent and purposes, inert. Suitable materials will include, any silicate, aluminate, carbide, carbon, carbonate metal, rock, mineral, clay, sulphate, nitrate, oxide, etc.

The molding compounds of the invention will generally comprise short lengths of inorganic fibers, as for example glass fibers, in an aldehyde condensate paste comprising from approximately 50% to approximately 80% by weight of powderous inorganic fillers in a chain extended, but fusible (B-staged) aldehyde condensate resin. The fibers preferably have a length of from approximately ⅛-inch to approximately ½-inch and may comprise up to approximately 25% of the molding compound.

I intend to include modifications and variations within the scope and spirit of this invention.

I claim:

1. A new and improved process for producing molding compounds comprising: mixing a liquid aldehyde condensate resole with inorganic fillers containing a divalent base to form a paste with the ratio of the resole to fillers being between 4:1 and 1:5, incorporating inorganic fibers into the paste, and converting the resole into a thickened state around the fillers to produce a mechanically handleable molding compound in which the resin will not separate from the filler.

2. The method of claim 1 wherein said resole is converted to a thickened handleable state after the fibers are incorporated therein.

3. The method of claim 2 wherein said paste solids comprises at least 50% by weight of inorganic filler.

4. The method of claim 3 wherein said condensate is a phenol-formaldehyde condensate.

5. A new and improved process of making sheet molding compound comprising: mixing a liquid aldehyde condensate resole with inorganic fillers containing a divalent base to form a paste with the ratio of the resole to fillers being between 4:1 and 1:5, flowing the paste into a first sheet, adding a layer of chopped fibers to said first sheet, placing a second sheet of paste on top of said layer of fibers, squeezing said first and second layers of paste together around the fibers, converting the resole into a thickened state around the fillers and fibers to produce a mechanically handleable sheet molding compound.

6. The method of claim 5 wherein said resole is converted to a B-stage after the sheet molding compound is made.

7. The method of claim 6 wherein said paste solids comprises at least 50% by weight of inorganic filler.

8. The method of claim 7 wherein said condensate is a phenol-formaldehyde condensate.

9. The method of claim 7 wherein said sheet molding compound is dehydrated while the resole is being B-staged.

10. The product produced by the process of claim 9.

11. A new and improved sheet molding compound comprising: inorganic fibers embedded in inorganic powderous fillers coated with an aldehyde condensate binder, said binder being B-staged in situ around the filler and fibers and being in a ratio to the fillers of between 4:1 and 1:5.

12. The sheet molding compound of claim 11 wherein said fillers comprise at least 50% by weight of the filler and binder.

13. The sheet molding compound of claim 12 wherein said binder is a phenol-formaldehyde condensate.

14. The sheet molding compound of claim 12 wherein said sheet molding compound is dehydrated to convert the binder to a solid state.

15. A molding compound comprising: short lengths of inorganic fibers embedded in a paste comprising inorganic powderous fillers that are dispersed throughout an aldehyde condensate binder, said binder being B-staged in situ around the fillers and fibers and being in a ratio to the fillers of between 4:1 and 1:5.

16. The molding compound of claim 15 wherein said fibers are chopped to lengths between ⅛-inch and ½-inch, and the inorganic powderous fillers comprise from 50 to 80% by weight of said paste.

17. The molding compound of claim 16 wherein said fibers are chopped glass fibers.

* * * * *